(12) United States Patent
Kim et al.

(10) Patent No.: US 8,417,153 B2
(45) Date of Patent: Apr. 9, 2013

(54) LIGHT GUIDE AND CHARGE ELIMINATING UNIT, IMAGE FORMING APPARATUS AND IMAGE READING APPARATUS HAVING THE SAME

(75) Inventors: Kyung Rok Kim, Seongnam-si (KR); Yong Geun Kim, Suwon-si (KR); Hyun Surk Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/107,026

(22) Filed: May 13, 2011

(65) Prior Publication Data

US 2011/0217076 A1    Sep. 8, 2011

Related U.S. Application Data

(63) Continuation of application No. 12/624,130, filed on Nov. 23, 2009, now Pat. No. 7,965,960.

(30) Foreign Application Priority Data

Jan. 16, 2009   (KR) .................. 10-2009-0003840

(51) Int. Cl.
*G03G 21/00*    (2006.01)
(52) U.S. Cl.
USPC .............................................. 399/128

(58) Field of Classification Search .............. 362/558; 399/128, 168, 177, 182, 191, 198, 199
See application file for complete search history.

(56) References Cited

U.S. PATENT DOCUMENTS

| | | |
|---|---|---|
| 6,678,491 B2 | 1/2004 | Kido et al. |
| 7,498,559 B2 | 3/2009 | Nishimura et al. |

FOREIGN PATENT DOCUMENTS

JP    2001-159796    6/2001

OTHER PUBLICATIONS

Notice of Allowance, mailed Feb. 14, 2011, in corresponding U.S. Appl. No. 12/624,130 (10 pp.).
Supplemental Notice of Allowability, mailed Mar. 25, 2011, in corresponding U.S. Appl. No. 12/624,130 (2 pp.).

*Primary Examiner* — Hoang Ngo
(74) *Attorney, Agent, or Firm* — Staas & Halsey LLP (57) ABSTRACT

Disclosed are a light guide member, a charge eliminating unit and an image forming apparatus and/or an image reading apparatus having the same. The light guide member may include an incidence face through which light is introduced, an irregular reflection portion arranged along a longitudinal direction of the light guide member for irregular reflection of the light introduced through the incidence face and an emission face arranged opposite the irregular reflection portion for emission of the light. At least one recess may be formed in the incidence face for diffusion of the light introduced through the incidence face.

27 Claims, 9 Drawing Sheets

LIGHT GUIDE AND CHARGE ELIMINATING UNIT, IMAGE FORMING APPARATUS AND IMAGE READING APPARATUS HAVING THE SAME

CROSS-REFERENCE TO RELATED APPLICATION

This application is a continuation of U.S. Ser. No. 12/624,130, filed Nov. 23, 2009, now U.S. Pat. No. 7,965,960 the disclosure of which is incorporated herein by reference. This application claims the benefit of Korean Patent Application No. 2009-0003840, filed on Jan. 16, 2009 in the Korean Intellectual Property Office, the disclosure of which is incorporated herein by reference.

TECHNICAL FIELD

The present disclosure relates generally to a light guide capable of low light loss and uniform light emission, and to a charge eliminating unit, an image forming apparatus and an image reading apparatus having the same.

BACKGROUND OF RELATED ART

Image forming apparatuses are devised to form an image on a printing medium. Examples of image forming apparatuses may include, e.g., printers, copiers, facsimiles, and so-called multi-functional devices that combine some of the functionalities of the aforementioned devices.

In an electro-photographic image forming apparatus, which is one type of image forming apparatuses, the surface of a photoconductor pre-charged to a certain electrical potential is exposed to light so as to form an electrostatic latent image thereon, which latent image is then developed into a visible image by means of a developer feed device that applies the developer to the electrostatic latent image. So formed visible image is then, transferred from the photoconductor to a printing medium either directly or indirectly by way of an intermediate transfer unit. Such image forming apparatus typically also include a charge eliminating unit for eliminating the residual electric potential remaining on the surface of the photoconductor after the transfer of the visible image and before charging of the photoconductor to begin the next image forming operation.

Generally, a charge eliminating unit includes a light source and a light guide that guides the light generated from the light source to the photoconductor. The configuration of the light guide affects the charge elimination performance. That is, to achieve a uniform charge elimination along the length of the photoconductor, the light emission from the light guide also needs to be sufficiently uniform along the same length direction of the photoconductor. In addition, for an effective charge elimination, a sufficient amount of the light received from the light source need to be delivered by the light guide to the photoconductor, which means the light emission face of the light guide needs to have a sufficiently low loss of light.

In addition to its use in a charge eliminating unit of an image forming apparatus, a light guide may also be found in a light source unit of an image reading apparatus for guiding light from a light source across a document being read. In such image reading applications, too, the afore-mentioned low light loss and uniform light emission characteristics of a light guide is desirable.

SUMMARY OF DISCLOSURE

In accordance with one aspect of the present disclosure, there may be provided a light guide member that may have a length that extends along the longitudinal direction from a first end thereof to a second end thereof opposite the first end, and that may include an incidence face, a irregular reflection portion and an emission face. The incidence face may be arranged at the first end, and may be configured to allow light incident thereupon to be received into the light guide member. The irregular reflection portion may extend along the longitudinal direction, and may define a irregular reflective surface that causes an irregular reflection of the light received through the incidence face. The emission face may extend along the longitudinal direction opposing the irregular reflection portion, and may be configured to allow light to exit therethrough from the light guide member. The incidence face may comprise at least one recess formed thereon so as to cause a diffusion of the light received through the incidence face.

The at least one recess may have a conical shape.

The light guide member may further comprise a re-reflecting portion arranged at the second end of the light guide member. The re-reflecting portion may have at least one reflective surface arranged to reflect light incident thereupon into the light guide member. The re-reflecting portion may define a slope having an inclination angle with respect to the longitudinal direction.

The inclination angle of the slope may be about 45 degrees with respect to the longitudinal direction.

The re-reflecting portion may define a pair of slopes. The angle between the pair of slopes may be in a range of about 84 degrees to about 96 degrees.

The re-reflecting portion may have a conical shape.

According to another aspect of the present disclosure, a charge eliminating unit for removing electrical charge from a photoconductor of an image forming apparatus may be provided to include a light source configured to produce light and a bar-shaped light guide member. The bar-shaped light guide member may have a length that extends along a longitudinal direction from a first end to a second end opposite the first end. The bar-shaped light guide member may comprise an incidence face, a irregular reflection portion and an emission face. The incidence face may be arranged at the first end facing the light source such that the light produced by the light source becomes incident thereupon and is received therethrough into the bar-shaped light guide member. The irregular reflection portion may extend along the longitudinal direction, and may define a irregular reflective surface that causes an irregular reflection of the light received through the incidence face. The emission face may extend along the longitudinal direction opposing the irregular reflection portion, and may be arranged to face the photoconductor and being configured to allow light to exit therethrough from the bar-shaped light guide member toward the photoconductor. The incidence face may comprise at least one recess formed thereon so as to cause a diffusion of the light received through the incidence face.

According to yet another aspect of the present disclosure, there may be provided an image forming apparatus that may comprise a photoconductor and a charge eliminating unit. The photoconductor may have a photosensitive surface. The charge eliminating unit may be configured to illuminate the photosensitive surface of the photoconductor to thereby remove an electrical charge from the photoconductor. The charge eliminating unit may comprise a light source configured to produce light and a bar-shaped light guide member. The bar-shaped light guide member having a length that extends along a longitudinal direction from a first end to a second end opposite the first end. The bar-shaped light guide member may comprise an incidence face, a irregular reflection portion and an emission face. The incidence face may be arranged at the first end facing the light source such that the light produced by the light source becomes incident thereupon and is received therethrough into the bar-shaped light guide member. The irregular reflection portion may extend along the longitudinal direction, and may define a irregular reflective surface that causes an irregular reflection of the light received through the incidence face. The emission face may extend along the longitudinal direction opposing the irregular reflection portion, and may be arranged to face the photoconductor and being configured to allow light to exit therethrough from the bar-shaped light guide member toward the photoconductor. The incidence face may comprise at least one recess formed thereon so as to cause a diffusion of the light received through the incidence face.

The image forming apparatus may further comprise a body, a charging device, a light scanning unit, a developing device and a transfer unit. The body may define the overall external appearance of the image forming apparatus. The photoconductor may be arranged in the body. The charging device may be configured to charge the photosensitive surface of the photoconductor to an electrical potential. The light scanning unit may be configured to irradiate light corresponding to image information on the photosensitive surface of the photoconductor that had been charged to the electrical potential thereby forming an electrostatic latent image on the photosensitive surface of the photoconductor. The developing device may be detachably received in the body, may have a developer reservoir, in which developer is stored, and may be configured to fed the developer from the developer reservoir to the photosensitive surface of the photoconductor thereby developing the electrostatic latent image into a visible image. The transfer unit may be configured to transfer the visible image formed on the photosensitive surface of the photoconductor to a printing medium.

The light source of the charge eliminating unit may be mounted to the main body. The bar-shaped light guide member of the charge eliminating unit may be mounted to the developing device.

According to even yet another aspect, an image reading apparatus for reading an image of a document by illuminating and sensing light reflection from the document may be provided to comprise a light source and a light guide member. The light source may be configured to produce light. The light guide member may have a length that extends along a longitudinal direction from a first end to a second end opposite the first end. The light guide member may comprise an incidence face, a irregular reflection portion and an emission face. The incidence face may be arranged at the first end facing the light source such that the light produced by the light source becomes incident thereupon and is received therethrough into the light guide member. The irregular reflection portion may extend along the longitudinal direction, and may define a irregular reflective surface that causes an irregular reflection of the light received through the incidence face. The emission face may extend along the longitudinal direction opposing the irregular reflection portion, and may be configured to allow light to exit therethrough from the light guide member toward the document. The incidence face may comprise at least one recess formed thereon so as to cause a diffusion of the light received through the incidence face.

BRIEF DESCRIPTION OF THE DRAWINGS

Various features and advantages of the present disclosure will become apparent and more readily appreciated from the following description of several embodiments thereof, taken in conjunction with the accompanying drawings, of which.

DETAILED DESCRIPTION OF SEVERAL EMBODIMENTS

Reference will now be made in detail to several embodiments of the present disclosure, examples of which are illustrated in the accompanying drawings, wherein like reference numerals refer to the like elements throughout.

Figure 1:
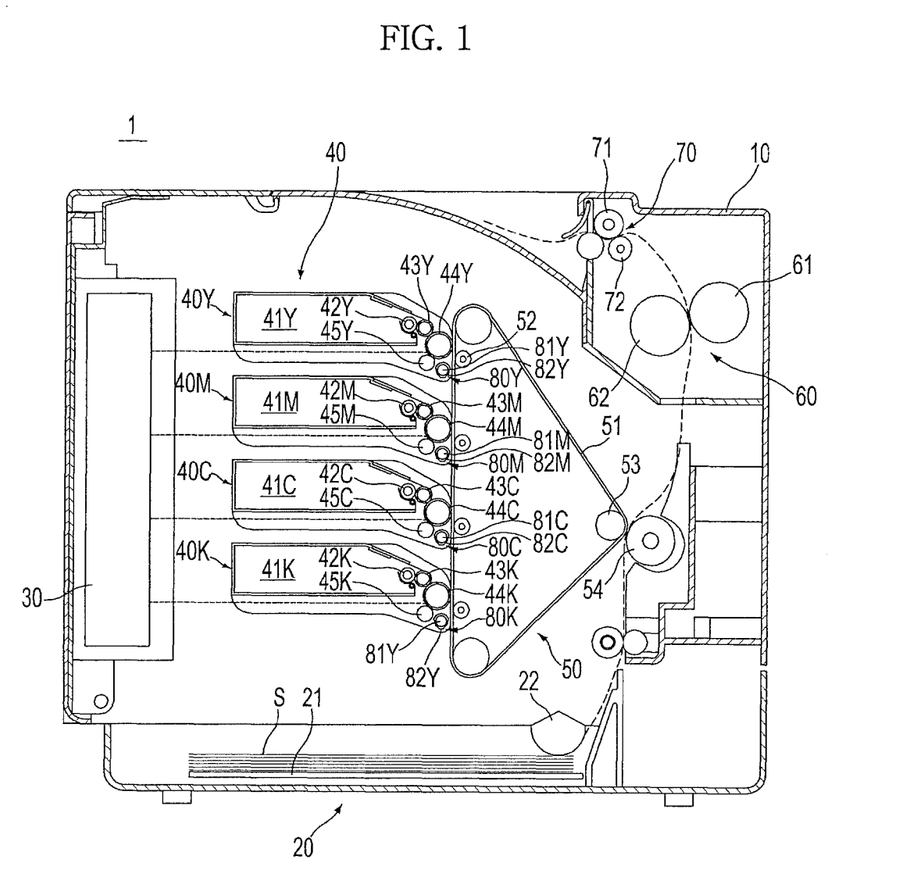
FIG. 1 is a sectional view of an image forming apparatus according to an embodiment of the present disclosure.

FIG. 1 is a sectional view illustrating a configuration of an image forming apparatus according to an embodiment.

As shown in FIG. 1, the image forming apparatus 1 according to an embodiment may include a body 10, a printing medium supply unit 20, a light scanning unit 30, a developing unit 40, a transfer unit 50, a fusing unit 60, a printing medium discharge unit 70 and charge eliminating units 80Y, 80M, 80C and 80K.

The body 10 defines an overall external appearance of the image forming apparatus 1, may support therein a variety of components of the image forming apparatus 1.

The printing medium supply unit 20 may include a cassette 21, in which printing media S may be stored, and a pickup roller 22 configured to pick up the printing media S stored in the cassette 21 sheet by sheet.

The light scanning unit 30 may be configured to irradiate light, which may be modulated according to the image information, onto photoconductors 44Y, 44M, 44C and 44K, thereby forming electrostatic latent images on the surfaces of the photoconductors 44Y, 44M, 44C and 44K.

The developing unit 40 may include four developing devices 40Y, 40M, 40C and 40K, which may receive therein developer of different colors, for example, Black (K), Cyan (C), Magenta (M), and Yellow (Y), respectively.

The developing devices 40Y, 40M, 40C and 40K may respectively include charging rollers 45Y, 45M, 45C and 45K, developer reservoirs 41Y, 41M, 41C and 41K, feed rollers 42Y, 42M, 42C and 42K, developing rollers 43Y, 43M, 43C and 43K, and the photoconductors 44Y, 44M, 44C and 44K. According to an embodiment, the developing devices 40Y, 40M, 40C and 40K may be detachably received in the body 10. It should be understood that the above description of the developing devices is provided by way of illustrative examples, and that various alternative embodiments of the developing devices may be possible. For example, in some embodiments, such as, for example, in some developing devices that use two component developer including a mixture of toner and carrier particles, the feed rollers may be omitted. In some embodiments, the photoconductor may be arranged in the body separate from the developing device. According to some monochromatic embodiments that does not require the formation of color images, only one rather the four as described above of developing device may suffice.

Referring again to FIG. 1, the charging rollers 45Y, 45M, 45C and 45K may be configured to charge the photoconductors 44Y, 44M, 44C and 44K, respectively, to a uniform electrical potential before the light scanning unit 30 irradiates light onto the photoconductors 44Y, 44M, 44C and 44K so as to form on surfaces thereof electrostatic latent images as patterns of potential differences between the light exposed and non-exposed portions of the photoconductor surfaces. While a roller type charger is shown, other types of charger such as, for example, a corona discharge type charger, may alternatively be used.

The developer reservoirs 41Y, 41M, 41C and 41K may store the developer to be fed to the photoconductors 44Y, 44M, 44C and 44K. The feed rollers 42Y, 42M, 42C and 42K may feed the developer stored in the developer reservoirs 41Y, 41M, 41C and 41K to the developing rollers 43Y, 43M, 43C and 43K. The developing rollers 43Y, 43M, 43C and 43K applies the developer on surfaces of the photoconductors 44Y, 44M, 44C and 44K so as to develop the electrostatic latent images that had been formed thereon into visible images.

The transfer unit 50, as with the photoconductors 44Y, 44M, 44C and 44K, may be a component of the image forming apparatus 1 that carries the visible image, and may include an intermediate transfer belt 51, first transfer rollers 52, and a second transfer roller 53. The first transfer rollers 52 may be arranged to oppose respectively the photoconductors 44Y, 44M, 44C and 44K with the intermediate transfer belt 51 interposed therebetween, and may serve to transfer the visible images from the photoconductors 44Y, 44M, 44C and 44K to the intermediate transfer belt 51. The second transfer roller 53 may be arranged to oppose a supporting roller 54 with the intermediate transfer belt 51 interposed therebetween, and may serve to transfer the visible images from the intermediate transfer belt 51 to a printing medium as the printing medium is routed to pass between the intermediate transfer belt 51 and the supporting roller 54 as shown in FIG. 1. While not shown in FIG. 1, as is known to those skilled in the art, the visible images can alternatively be transferred directly from the photoconductors to the printing medium by routing the printing medium along a travel path that allows a direct contact between the printing medium and each of the photoconductors, in which case the intermediate transfer belt 51 may not be necessary or it could serve the function of carrying the printing medium to each of the photoconductors.

The fusing unit 60 may include a heating roller 61 having a heater and a press roller 62 arranged to oppose the heating roller 61. When the printing medium, onto which the visible images had been transferred, passes between the heating roller 61 and the press roller 62, the visible images are fixed onto the printing medium by the heat from the heating roller 61 and the pressure exerted between the heating roller 61 and the press roller 62.

The printing medium discharge unit 70 may include a printing medium discharge roller 71 and a printing medium backup roller 72, and may serve to discharge the printing medium, which has passed through the fusing unit 60, to the outside of the body 10.

The charge eliminating units 80Y, 80M, 80C and 80K may operate to eliminate a residual electric potential remaining on the surfaces of the respective photoconductors 44Y, 44M, 44C and 44K. To that end, the charge eliminating units 80Y, 80M, 80C and 80K may respectively include light sources 81Y, 81M, 81C and 81K for producing light for use in the charge elimination and light guide members 82Y, 82M, 82C and 82K to guide the light from the light sources 81Y, 81M, 81C and 81K to the photoconductors 44Y, 44M, 44C and 44K, respectively. According to an embodiment, the light sources 81Y, 81M, 81C and 81K may be arranged in the body 10 while the light guide members 82Y, 82M, 82C and 82K may be provided in the developing devices 40Y, 40M, 40C and 40K that are detachably received in the body 10. According to an aspect of the present disclosure, the charge eliminating units 80Y, 80M, 80C and 80K according to embodiments described herein may advantageously have an improved light guide configuration capable of emitting the charge elimination light uniformly along the longitudinal direction of the photoconductors 44Y, 44M, 44C and 44K. This will be further described later in greater detail.

Briefly, the operation of the image forming apparatus 1 having the above-described configuration will now be described. Upon the initiation of a printing operation, the charging rollers 45Y, 45M, 45C and 45K charge the surfaces of the photoconductors 44Y, 44M, 44C and 44K to a uniform potential. Then, the light scanning unit 30 irradiates light that corresponds to the image information of different colors, to the uniformly charged surfaces of the photoconductors 44Y, 44M, 44C and 44K. According to an embodiment, the light may be irradiated through slits or openings of the light scanning unit 30 where each of the opening corresponds to the respective one of photoconductors 44Y, 44M, 44C and 44K. As a result of the light exposure, electrostatic latent images of different colors are respectively formed on the photoconductors 44Y, 44M, 44C and 44K, e.g., an electrostatic latent image of a color on each photoconductor.

Subsequently, a developing bias current may be applied to the developing rollers 43Y, 43M, 43C and 43K of the respective developing devices 40Y, 40M, 40C and 40K, causing a pattern of developer corresponding to the electrostatic latent images to adhere on the photoconductors so as to develop the electrostatic latent images into visible images on the photoconductors 44Y, 44M, 44C and 44K. The visible images may then be transferred to the intermediate transfer belt 51 by the first transfer rollers 52. The image forming apparatus 1 according to an embodiment may be of a tandem type, which allows each of the yellow (Y), magenta (M), cyan (C), and black (K) visible images of the photoconductors 44Y, 44M, 44C and 44K, respectively, to be simultaneously transferred to the intermediate transfer belt 51. According to an alternative embodiment, each of the visible images of the photoconductors 44Y, 44M, 44C and 44K may be transferred in sequence such that the transferred images overlap one another on the intermediate transfer belt 51 as the belt rotates passed each of the photoconductors.

The charge eliminating units 80Y, 80M, 80C and 80K may eliminate the residual electric potential pattern remaining on the surfaces of the photoconductors 44Y, 44M, 44C and 44K by illuminating the surface with a charge elimination light. The photoconductors 44Y, 44M, 44C and 44K may subsequently be again charged by the charging rollers 45Y, 45M, 45C and 45K for the initiation of the formation of the next image.

Figure 2A:
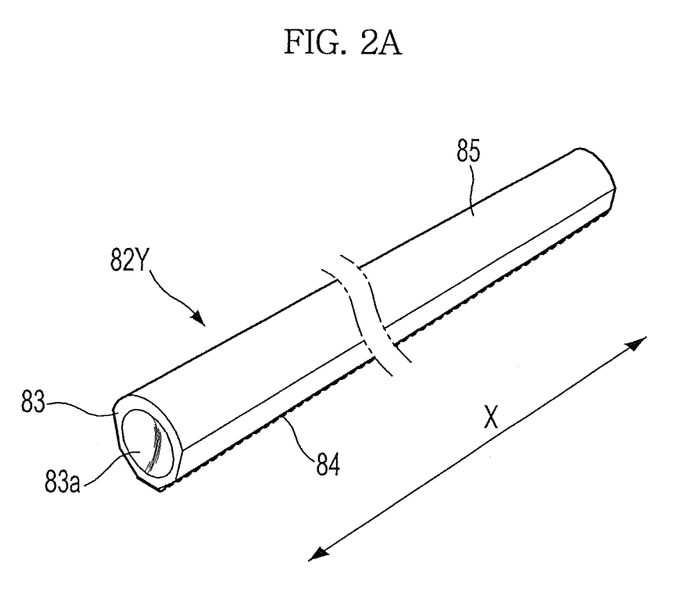
FIGS. 2A and 2B are perspective views illustrating a light guide member according to an embodiment of the present disclosure.
Figure 2B:
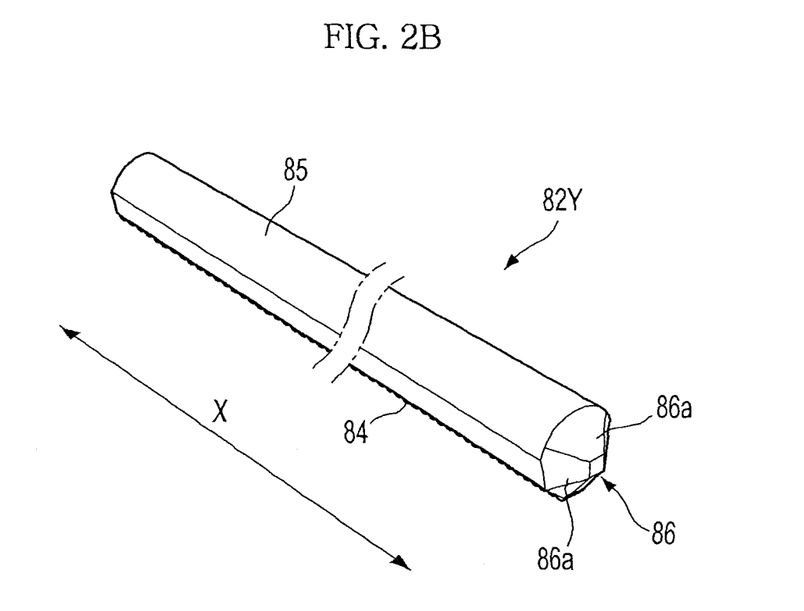
Figure 3:
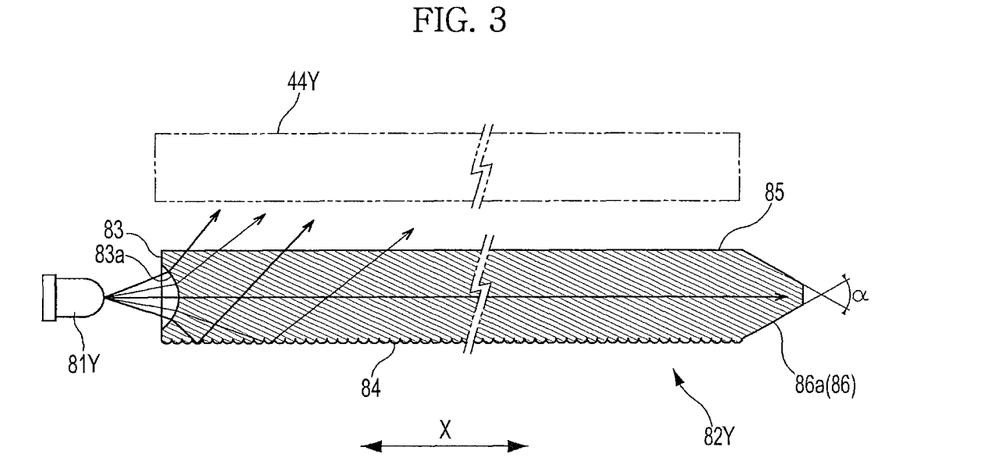
FIG. 3 is a sectional view illustrative of an operation of a charge eliminating unit according to an embodiment of the present disclosure.

FIGS. 2A and 2B are perspective views illustrating the light guide member according to an embodiment of the present disclosure, whereas FIG. 3 is a sectional view illustrating an operation of the charge eliminating unit according to an embodiment of the present disclosure.

For purposes of illustrative convenience, hereinafter, only the charge eliminating unit 80Y, which eliminates a residual electric potential of the photoconductor 44Y of the yellow developing device 40Y, will be described as an illustrative example. Accordingly, unless otherwise stated, the following description may be similarly applicable to the other developing devices 40M, 40C and 40K.

Referring to FIGS. 2A, 2B and 3, the charge eliminating unit 80Y may include the light source 81Y (see FIG. 3) that is configured to produce the charge eliminating light and the light guide member 82Y for guiding the charge eliminating light from the light source 81Y to the photoconductor 44Y. According to an embodiment, and as shown in FIGS. 2A and 2B, the light guide member 82Y may have a bar or a rod shape.

According to an embodiment, the light source 81Y may be, for example, a Light Emitting Diode (LED) provided at one side of the bar-shaped light guide member 82Y separate from the light guide member 82Y. It should be understood however that any other types of light sources may be used, and that the light source may be arranged integrally with the light guide member as an integrated unit.

The light guide member 82Y may include an incidence face 83, upon which the light from the light source 81Y is incident, an irregular reflection portion 84 arranged along the longitudinal direction thereof (i.e., the direction X as indicated in FIGS. 2A, 2B and 3) for scattered reflection of the light received through the incidence face 83 and an emission face 85 arranged opposite the irregular reflection portion 84 for emission of the light toward the photoconductor 44Y.

According to an embodiment, the light guide member 82Y may further include a recess 83a formed in the incidence face 83 for diffusion of the light introduced through the incidence face 83. With the above described configuration, in the charge eliminating unit 80Y according to the embodiment shown in FIG. 3, when light is introduced through the incidence face 83, the light may be refracted and diffused by the recess 83a. Therefore, there may be an increased likelihood that the light introduced through the incidence face 83 will collide with the irregular reflection portion 84, and thereby reflected in the direction of being emitted through the emission face 85. In other words, it may be possible to reduce the loss of the light that may result from some of the light introduced through the incidence face 83 being directed in the direction opposite the incidence face 83, by having greater amount of the light to be directed to the emission face 85 of the light guide member 82Y. Such reduction in the loss of light may advantageously result in an enhanced charge elimination efficiency. Further, the incidence face 83 may increase the diffusion angle of the light incident thereupon, and therefore may allow an improved uniformity in the light emission along the longitudinal direction X of the light guide member 82Y.

In addition, according to an embodiment, the light guide member 82Y may include a re-reflecting portion 86 provided at the end opposite the incidence face 83. The re-reflecting portion 86 may be adapted to reflect the light, which has not been emitted through the emission face 85, back toward the interior of the light guide member 82Y (see FIGS. 2B and 3).

The re-reflecting portion 86 may include slopes 86a having a certain inclination with respect to the longitudinal direction x. For example, according to an embodiment, the slopes 86a of the re-reflecting portion 86 according to an embodiment may have an inclination in a range of about 42 degrees to about 48 degrees with respect to the longitudinal direction x. A pair of two slopes 86a may be arranged symmetrically with respect to each other. That is, the angle a between the two slopes 86a may be the sum of the individual slopes, and, in the case of the above specific example, may be in a range of about 84 degrees to 96 degrees. While in the above description, the re-reflecting portion 86 of the light guide member 82Y is described to include a pair of two slopes as reflecting faces, the number, or the number of pairs, of the reflecting faces need not be so limited. The inclinations of the slopes may also vary.

With the light guide member according to an embodiment having the above-described configuration, even if some portion of the light reaches the far end of the light guide member 82Y opposite the incidence face 83 end rather than being directed to the emission face 85, such portion of the light has a greater likelihood of being reflected into the light guide member 82Y rather than being emitted out of the light guide member 82Y through portions of the light guide member other than the emission face 85, resulting in an enhanced charge elimination efficiency, i.e. a reduction in the loss of light introduced into the light guide member 82Y. Furthermore, with the slopes 86a each having an angle, for example, in a range of about 42 degrees to 48 degrees, with respect to the longitudinal direction x, the portion of the light initially proceeding parallel to the longitudinal direction x may be effectively reflected back into the light guide member 82Y.

Figure 4:
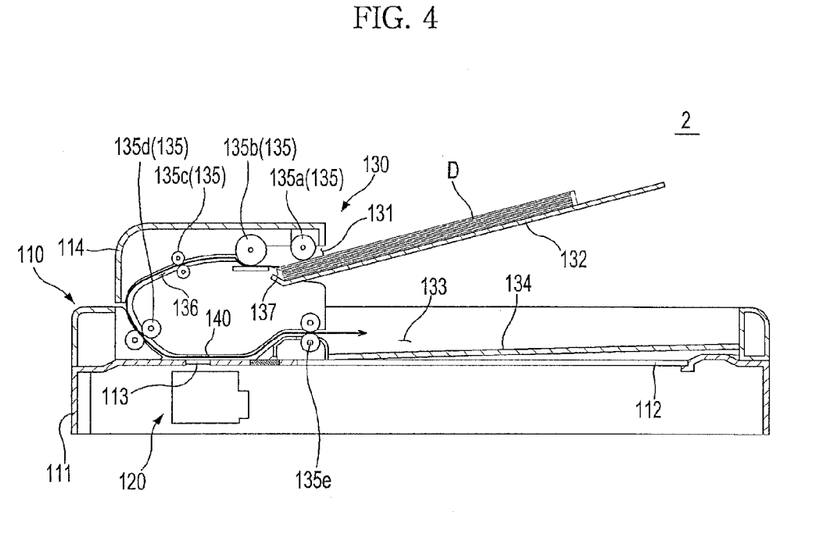
FIG. 4 is a sectional view illustrating a configuration of an image reading apparatus according to an embodiment of the present disclosure.
Figure 5:
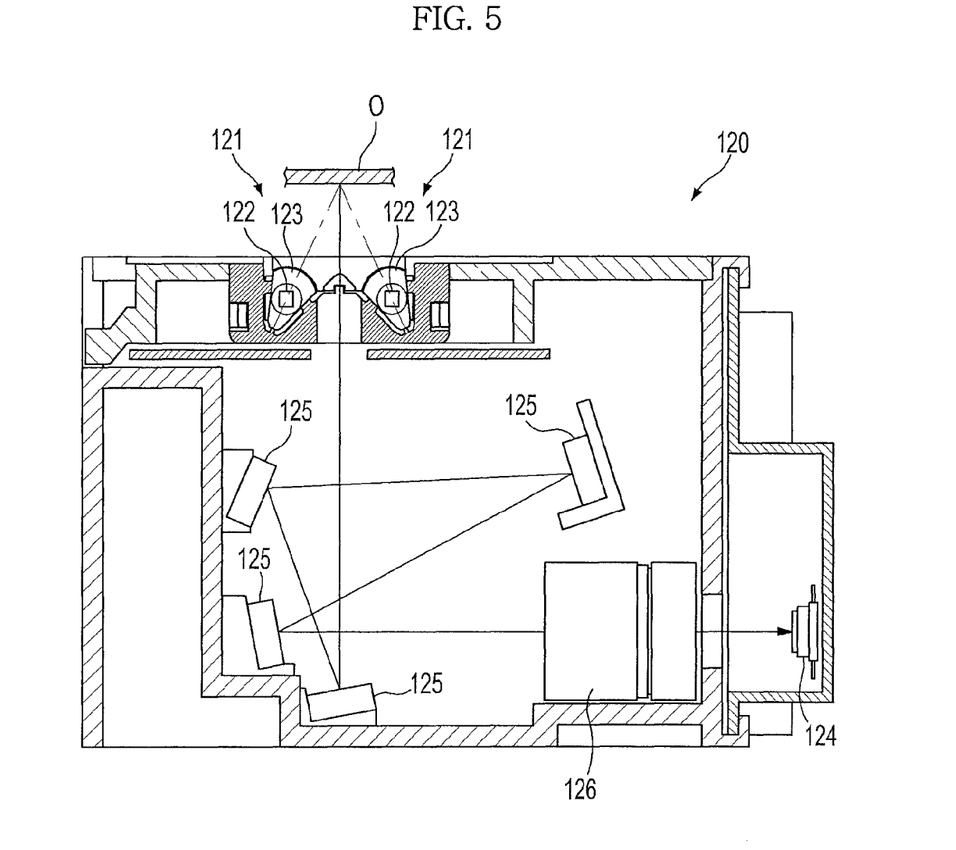
FIG. 5 is a sectional view illustrating a configuration of a reading unit of the image reading apparatus of FIG. 4.

FIG. 4 is a sectional view illustrating a configuration of an image reading apparatus according to an embodiment of the present disclosure, whereas FIG. 5 is a sectional view illustrating the configuration of a reading unit of the image reading apparatus of FIG. 4.

As shown in FIG. 4, an image reading apparatus 2 according to an embodiment may include a body 110, a reading unit 120 and an automatic document feeder (ADF) 130.

The body 110 may include a scanning frame 111 and a cover 114. The reading unit 120 may be mounted inside the scanning frame 111 underneath a flat panel window 112 and ADF window 113 that are provided at the upper surface of the scanning frame 111. The cover 114 may be pivotally or rotatably coupled to the scanning frame 111, and may be adapted to selectively open or close the upper surface of the scanning frame 111. The automatic document feeder 130 may be provided at the cover 114.

The automatic document feeder 130 may include a document inlet 131 into which a document to be read is introduced, a document outlet 133 from which a completely read document is discharged, rollers 135 for document delivery, and a document delivery path 136 defined in the interior of the cover 114 for document delivery.

According to an embodiment, the document inlet 131 may be formed in one side of the cover 114 while the document outlet 133 is located on the same side under the document inlet 131. A document feed tray 132 may be provided near the document inlet 131, on which documents to be delivered by the automatic document feeder 130 may be loaded. A document discharge tray 134 may be provided near the document outlet 133, onto which the documents that have been read are discharged through the document outlet 133.

The rollers 135 for document delivery include a document pickup roller 135a for picking up documents D loaded on the document feed tray 132, first to third delivery rollers 135b, 135c and 135d for delivering each document picked up by the document pickup roller 135a along the document delivery path 136 and document discharge rollers 135e for discharging a read document onto the document discharge tray 134. Of the delivery rollers 135, according to an embodiment, the first delivery roller 135b closest to the document pickup roller 135a may also perform the function of separating the documents picked-up by the document pickup roller 135a into individual sheets. To that end, a frictional pad 137 may be provided opposite the first delivery roller 135b.

The document delivery path 136 may have an approximated 'C' shaped. One end of the document delivery path 136 is connected to the document feed tray 132 through the document inlet 131 while the other end of the document delivery path 136 is connected to the document discharge tray 134 through the document outlet 133. The ADF window 113 may be disposed on the document delivery path 136, and may provide the window through which the light from light sources 122 of the reading unit 120 (see FIG. 5) and the light reflected from the document may pass. A reference bar 140 may additionally be provided on the document delivery path 136, and may be adapted to support the document in close contact with the ADF window 113.

In one operational mode, the reading unit 120 may read a document placed on the flat panel window 112 while the reading unit 120 moves underneath and along the flat panel window 112. In an alternative operational mode, the reading unit 120 may be located stationary under the ADF window 113, and may read image information recorded in a document delivered by the automatic document feeder 130 along the document delivery path 136 past the ADF window 113.

Referring to FIG. 5, the reading unit 120 according to an embodiment may read image information by irradiating light to an object O to be read. To that end, the reading unit 120 according to an embodiment may include a light source unit 121, which may in turn include the light sources 122, for irradiating light to the object O to be read, an image sensor 124, a plurality of reflecting members 125 and a condensing lens 126 arranged on an optical path between the light sources 122 and the image sensor 124.

The plurality of reflecting members 125 may each reflect light reflected from the object O so as to guide the light received from the object O to the image sensor 124. The condensing lens 126 may be located in front of the image sensor 124 in the optical path, and may focuses the light on the image sensor 124.

The image sensor 124 may receive the light reflected from the object O, and may convert the received light into electrical signals. The image sensor 124 may be, for example, a Charge Coupled Device (CCD), or a Contact Image Sensor (CIS), and may output an analog image signal of a certain number of pixels based on the particular resolution selected. An analog/digital (A/D) converter (not shown) may be provided to convert the analog image signal produced in the image sensor 124 into digital data.

The light source unit 121 may include the light sources 122 that produce light and light guide members 123 for guiding the light from the light sources 122 to the object O. The light sources 122 may be white light emitting diodes, for example. The light guide members 123 may change the optical path of the light from the light sources 122 so as to guide the light to the object O. The light guide members 123 may have substantially the same configuration as any of the embodiments of the light guide member 82Y previously described above and any of the embodiments of light guide member, which will be described below. Accordingly, the light guide members 123 according to several embodiments herein may assure a uniform emission of incident light along the longitudinal direction thereof, and may exhibit reduced loss of light. As would be appreciated from the above illustrated image reading apparatus example, it should be noted that the light guide members according to the embodiments previously described and to embodiments that will be described hereinafter may be applicable to the image reading apparatus as well as the image forming apparatus, and may be applicable to any other application in which a uniformity of light illumination is desired.

Figure 6:
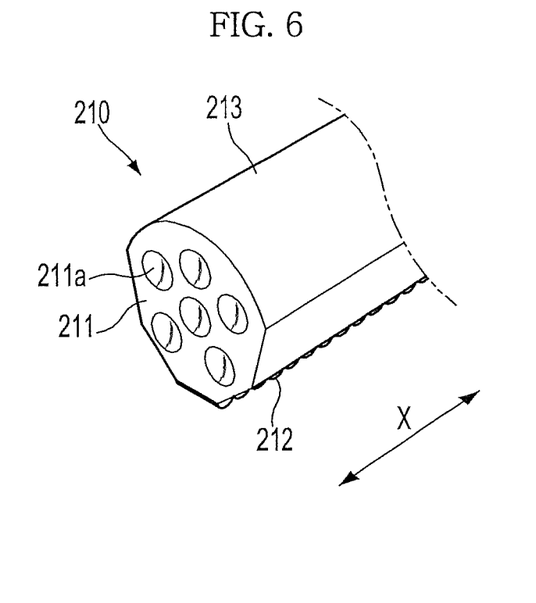
FIG. 6 is a perspective view illustrating a light guide member according to another embodiment of the present disclosure.

FIG. 6 is a perspective view illustrating a light guide member according to another embodiment. Referring to FIG. 6, a light guide member 210 according to an embodiment may include an incidence face 211, through which light from a light source may be introduced into the light guide member 210, an irregular reflection portion 212 arranged along the longitudinal direction X for irregular reflection of the light introduced through the incidence face 211 and an emission face 213 arranged opposite the irregular reflection portion 212 for emission therethrough of the light out of the light guide member 210. As shown in FIG. 6, according to an embodiment, the light guide member 210 may include a plurality of recesses 211a formed at the incidence face 211. The recesses 211a of the incidence face 211 are not limited to a specific number.

Figure 7:
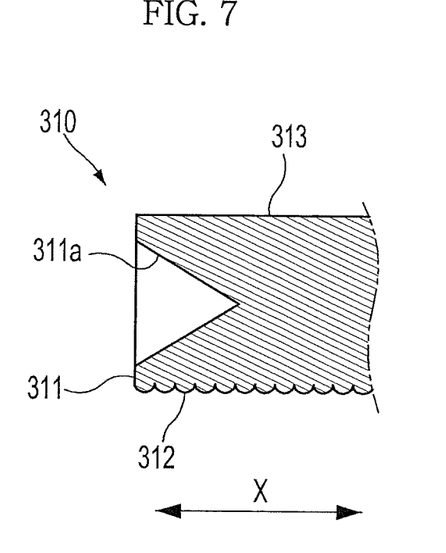
FIG. 7 is a view illustrating a light guide member according to another embodiment of the present disclosure.

FIG. 7 is illustrative of a light guide member according to another embodiment. As illustrated in FIG. 7, a light guide member 310 according to an embodiment may include a recess 311a formed at the incidence face 311. The recess 311a according to an embodiment may have a conical shape as illustrated, which allows most of the light introduced through the recess 311a to be refracted toward the irregular reflection portion 312 or toward the emission face 313. As a result, only an extremely small amount of light reaches the side opposite to the incidence face 311. As previously mentioned, it should be noted however that the shape of the recess at the incidence face 311 can be any shape, and that the specific shape shown in FIG. 7 is merely a non-limiting illustrative example.

Figure 8:
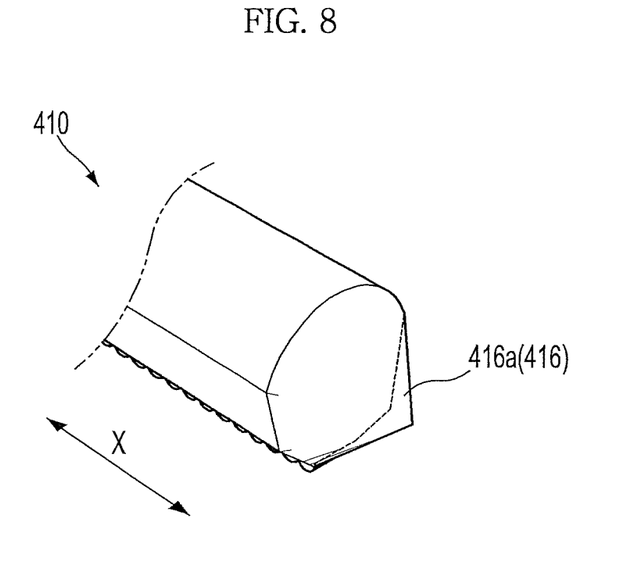
FIG. 8 is a perspective view illustrating a light guide member according to yet another embodiment of the present disclosure.

FIG. 8 is a perspective view illustrating a light guide member according to yet another embodiment. As shown in FIG. 8, a light guide member 410 according to an embodiment may include a re-reflecting portion 416 arranged to allow the light that has reached the opposite side of the incidence face to be reflected back into the light guide member 410. As shown in FIG. 8, according to an embodiment, the re-reflecting portion 416 may have a conical shape with its conical face 416a having an angle, for example, in the range of about 42 degrees to 48 degrees, with respect to the longitudinal direction of the light guide member 410. It is worth noting once again that the particular shape of the re-reflecting portion illustrated in FIG. 8 is given by way of mere example, and that the re-reflecting portion may have various other shapes.

As is apparent from the above description, a light guide member according to one or more of the several embodiments herein described may provide an improved uniformity of light emission and a reduction in the loss of incident light, and consequently can advantageously be, utilized in various light guiding application, including, but not limited to, in a charge elimination device, image forming apparatus and image reading apparatus.

While the disclosure has been particularly shown and described with reference to several embodiments thereof with particular details, it will be apparent to one of ordinary skill in the art that various changes may be made to these embodiments without departing from the principles and spirit of the invention, the scope of which is defined in the following claims and their equivalents.

The invention claimed is:

1. A light guide member having a length that extends along a longitudinal direction from a first end to a second end opposite the first end, comprising:
an incidence face arranged at the first end, the incidence face being configured to allow light incident thereupon to be received into the light guide member;
a re-reflecting portion arranged at the second end of the light guide member, the re-reflecting portion having at least one reflective surface arranged to reflect light incident thereupon into the light guide member; and an emission face extending along the longitudinal direction, the emission face being configured to allow light to exit therethrough from the light guide member, wherein the incidence face comprises at least one recess formed thereon so as to cause a diffusion of the light received through the incidence face.

2. The light guide member according to claim 1, wherein the at least one recess has a conical shape.

3. The light guide member according to claim 1,
wherein the re-reflecting portion defining a slope having an inclination angle with respect to the longitudinal direction.

4. The light guide member according to claim 3, wherein the inclination angle of the slope is about 45 degrees with respect to the longitudinal direction.

5. The light guide member according to claim 3, wherein the re-reflecting portion defines a pair of slopes, and
wherein an angle between the pair of slopes is in a range of about 84 degrees to about 96 degrees.

6. The light guide member according to claim 3, wherein the re-reflecting portion has a conical shape.

7. The light guide member according to claim 1, further comprising:
an irregular reflection portion extending along the longitudinal direction, the irregular reflection portion defining a irregular reflective surface that causes an irregular reflection of the light received through the incidence face.

8. A charge eliminating unit for removing electrical charge from a photoconductor of an image forming apparatus, comprising:
a light source configured to produce light; and
a light guide member having a length that extends along a longitudinal direction from a first end to a second end opposite the first end,
wherein the light guide member comprises:
an incidence face arranged at the first end facing the light source such that the light produced by the light source becomes incident thereupon and is received therethrough into the light guide member;
a re-reflecting portion arranged at the second end and having at least one reflective surface arranged to reflect light incident thereupon into the light guide member; and
an emission face extending along the longitudinal direction, the emission face being arranged to face the photoconductor and being configured to allow light to exit therethrough from the light guide member toward the photoconductor, and
wherein the incidence face comprises at least one recess formed thereon so as to cause a diffusion of the light received through the incidence face.

9. The charge eliminating unit according to claim 8,
wherein the re-reflecting portion defining a slope having an inclination angle with respect to the longitudinal direction.

10. The charge eliminating unit according to claim 9, wherein the inclination angle of the slope is about 45 degrees with respect to the longitudinal direction.

11. The charge eliminating unit according to claim 9, wherein the re-reflecting portion defines a pair of slopes, and
wherein an angle between the pair of slopes is in a range of about 84 degrees to about 96 degrees.

12. The charge eliminating unit according to claim 9, wherein the re-reflecting portion has a conical shape.

13. The charge eliminating unit according to claim 8, further comprising:
an irregular reflection portion extending along the longitudinal direction, the irregular reflection portion defining a irregular reflective surface that causes an irregular reflection of the light received through the incidence face.

14. An image forming apparatus, comprising:
a photoconductor having a photosensitive surface; and
a charge eliminating unit configured to illuminate the photosensitive surface of the photoconductor to thereby remove an electrical charge from the photoconductor,
wherein the charge eliminating unit comprises:
a light source configured to produce light; and
a light guide member having a length that extends along a longitudinal direction from a first end to a second end opposite the first end, and
wherein the light guide member comprises:
an incidence face arranged at the first end facing the light source such that the light produced by the light source becomes incident thereupon and is received therethrough into the bar-shaped light guide member;
a re-reflecting portion arranged at the second end and having at least one reflective surface arranged to reflect light incident thereupon into the light guide member; and
an emission face extending along the longitudinal direction, the emission face being arranged to face the photoconductor and being configured to allow light to exit therethrough from the light guide member toward the photoconductor, and
wherein the incidence face comprises at least one recess formed thereon so as to cause a diffusion of the light received through the incidence face.

15. The image forming apparatus according to claim 14, further comprising: a body defining an overall external appearance of the image forming apparatus, the photoconductor being arranged in the body;
a charging device configured to charge the photosensitive surface of the photoconductor to an electrical potential;
a light scanning unit configured to irradiate light corresponding to image information on the photosensitive surface of the photoconductor that had been charged to the electrical potential thereby forming an electrostatic latent image on the photosensitive surface of the photoconductor;
a developing device detachably received in the body and having a developer reservoir, in which developer is stored, the developing device being configured to fed the developer from the developer reservoir to the photosensitive surface of the photoconductor thereby developing the electrostatic latent image into a visible image; and
a transfer unit configured to transfer the visible image formed on the photosensitive surface of the photoconductor to a printing medium.

16. The image forming apparatus according to claim 15, wherein the light source of the charge eliminating unit is mounted to the main body, and
wherein the light guide member of the charge eliminating unit is mounted to the developing device.

17. The image forming apparatus according to claim 14, wherein the at least one recess has a conical shape.

18. The image forming apparatus according to claim 17, wherein the re-reflecting portion defines a pair of slopes, and
wherein an angle between the pair of slopes is in a range of about 84 degrees to about 96 degrees.

19. The image forming apparatus according to claim 14, wherein the re-reflecting portion defining a slope having an inclination angle with respect to the longitudinal direction.

20. The image forming apparatus according to claim 19, wherein the inclination angle of the slope is about 45 degrees with respect to the longitudinal direction.

21. The image forming apparatus according to claim 19, wherein the re-reflecting portion has a conical shape.

22. The image forming apparatus according to claim 14, further comprising:
an irregular reflection portion extending along the longitudinal direction, the irregular reflection portion defining a irregular reflective surface that causes an irregular reflection of the light received through the incidence face.

23. An image reading apparatus for reading an image of a document by illuminating and sensing light reflection from the document, comprising:
a light source configured to produce light; and
a light guide member having a length that extends along a longitudinal direction from a first end to a second end opposite the first end,
wherein the light guide member comprises:
an incidence face arranged at the first end facing the light source such that the light produced by the light source becomes incident thereupon and is received therethrough into the light guide member;
a re-reflecting portion arranged at the second end and having at least one reflective surface arranged to reflect light incident thereupon into the light guide member; and
an emission face extending along the longitudinal direction, the emission face being configured to allow light to exit therethrough from the light guide member toward the document, and
wherein the incidence face comprises at least one recess formed thereon so as to cause a diffusion of the light received through the incidence face.

24. The image reading apparatus according to claim 23, further comprising an image sensor configured to receive the light reflected from the document and to convert the received light into an electrical signal.

25. The image reading apparatus according to claim 23, wherein the re-reflecting portion defining a slope having an inclination angle with respect to the longitudinal direction.

26. The image reading apparatus according to claim 25, wherein the re-reflecting portion has a conical shape.

27. The image reading apparatus according to claim 23, further comprising:
an irregular reflection portion extending along the longitudinal direction, the irregular reflection portion defining a irregular reflective surface that causes an irregular reflection of the light received through the incidence face.

* * * * *